June 29, 1965   W. J. METZGER   3,191,970
RAILWAY CAR CONDUIT CONNECTORS
Filed Dec. 29, 1960   2 Sheets-Sheet 1
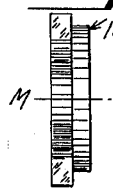
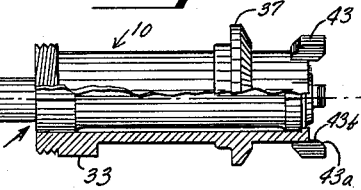
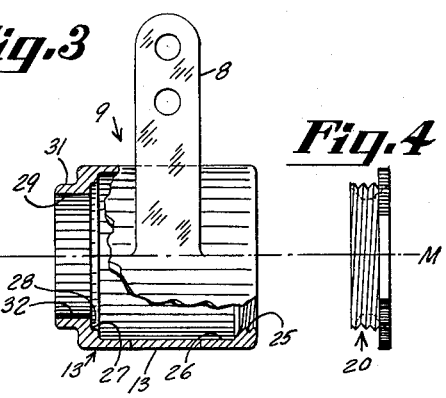
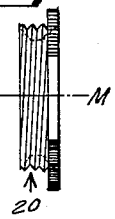
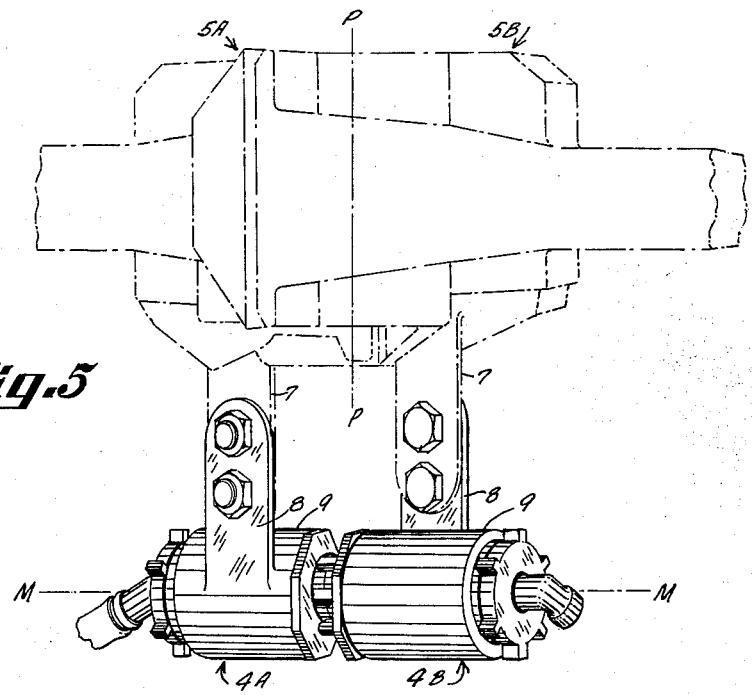
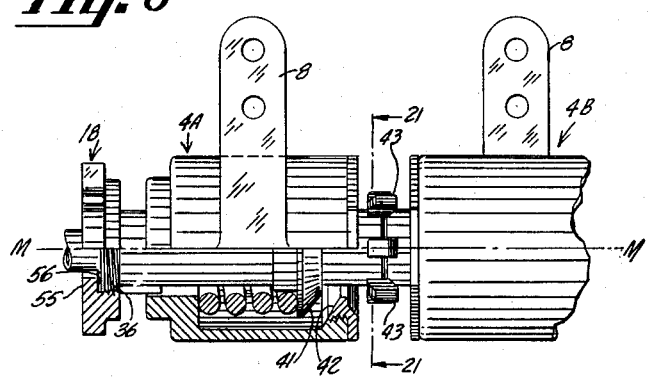
INVENTOR.
WILLIAM J. METZGER
BY
Henry Kozak
ATTORNEY June 29, 1965  W. J. METZGER  3,191,970
RAILWAY CAR CONDUIT CONNECTORS
Filed Dec. 29, 1960  2 Sheets-Sheet 2
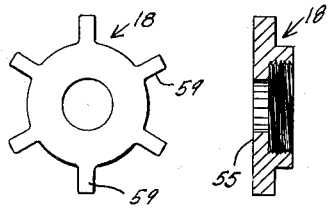
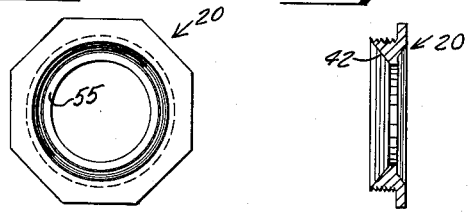
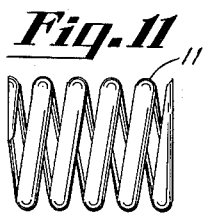
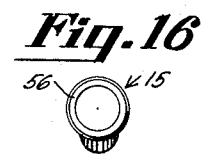
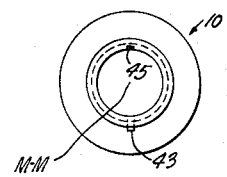
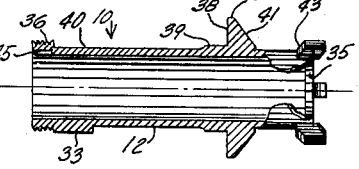
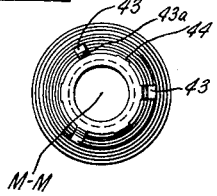
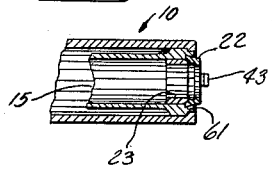
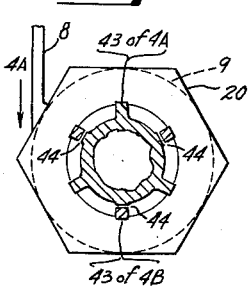
INVENTOR.
WILLIAM J. METZGER
BY
Henry Kozak
ATTORNEY

United States Patent Office 3,191,970
Patented June 29, 1965

3,191,970
RAILWAY CAR CONDUIT CONNECTORS
William J. Metzger, East Cleveland, Ohio, assignor to National Castings Company, a corporation of Ohio
Filed Dec. 29, 1960, Ser. No. 79,225
8 Claims. (Cl. 285—27)

This invention relates to terminal connectors of separable sections of fluid-conducting lines. The invention is concerned with connectors, such as used at each end of a single section of conduit carried by a railway car for the transmission of, for example, steam or air. The invention contemplates that connectors in railway use are to be supported under each end of the car in fixed relation with a coupler to effect automatic connection with a connector carried at the nearer end of an adjacent car.

Automatic coupling railway car service line connectors of the prior art are, in general, suitable for use only on railway cars equipped with interlocking type couplers which maintain tight face engagement. Such couplers are characterized by mating pocket and projection structure which holds coupled couplers from appreciable relative movement in any direction transverse to the longitudinal coupling line of the couplers. However, there is a lack of satisfactory fluid-line connectors adapted for use with non-interlocking type couplers. Whenever possible, it is desired to use the less expensive types of couplers which do not include the tight-face and interlocking structure necessary for maintaining coupled couplers almost entirely free of transverse or longitudinal relative movements. For example, the Willison fixed-jaw type or the knuckle type of couplers are subject to some longitudinal and lateral working in the operation of a train which must be accommodated in the coupling of a fluid line between adjacent cars. Generally speaking, this could only result in relative angling and lateral movements of opposed ends of present types of automatic connectors, and consequently severe wear and chafing and perhaps a loss of fluid communication at the engaged connector extremities.

A universal requirement of automatically coupling fluid-line conductors is a gasket or other annular element of resilient elastic material, e.g., rubber which forms the actual extremity of the fluid-conducting chamber of a connector and consequently engages a similar element of an opposed connector to seal two adjacent sections of a conduit. These elements normally deteriorate more rapidly than any other part of the connector and hence are preferably made easily replaceable. In present types of connectors, substantial disassembly of the connector is required in order to effect such replacement.

A primary object of the invention is to provide an automatically coupling connector for a railway vehicle fluid-transmitting line having at least a fluid conducting portion capable of lateral, longitudinal, and universal angling movements adapting the connector for use with non-interlocking types of car couplers.

Another object is to provide connector construction enabling simple and rapid replacement of a fluid-conducting element of the conductor, particularly that element thereof which forms a seal with a mating element of an opposed connector.

Another closely related object is to enable replacement of the fluid-conducting element without uncoupling adjacent vehicles.

Still another object is to provide connectors in accordance with the foregoing objects constructed to positively maintain axial alignment of opposed ends of fluid conducting elements of the connectors to eliminate chafing and excessive wear.

A further object is to provide connectors according to the foregoing objects in which the aforementioned fluid-conducting element is automatically centered within the connector when free of another connector.

In furtherance of the above stated objects, a fluid transmission line connector especially adapted for use on railway vehicles is provided which, in its broadest aspect, comprises an outer housing adapted for connection to a railway car coupler, and a sleeve of greater length than the housing extending therethrough with a flange projecting from its longitudinal wall disposed within the housing. The housing has a longitudinal wall disposed generally centrally within that of the sleeve and of greater interior corresponding cross dimension or diameter than that of the periphery of the sleeve. The housing and the sleeve have front ends facing in the normal use of the connector, toward a similar connector coupled therewith. The housing has a rear opening through which the rear portion of the sleeve projects, and a shoulder portion extending transversely or radially inwardly from its longitudinal wall to define a front opening of the housing of less corresponding cross dimension or diameter than the outer corresponding cross dimension or diameter of the flange but substantially greater than the exterior corresponding cross dimension or diameter of the sleeve wall. Resilient means react between spaced confronting portions of the casing and the sleeve, preferably between a rear shoulder portion of the housing wall defining its rear opening, and the flange of the sleeve to urge the sleeve forwardly within the housing to seat the flange against the front shoulder portion. The relationship of the dimensions just described affords a desired freedom of the sleeve in lateral, and angling movements of the sleeve with respect to the housing. The resilient means permits relative longitudinal movements of the sleeve and the housing.

In a preferred embodiment, the sleeve has a shoulder extending radially inwardly of a front terminal portion of its wall, and the connector further comprises a cylinder having an external periphery adapting it to fit snugly within the sleeve and to seat against the shoulder. Fastening means, such as a nut in threaded, telescopic relation with the rear end portion of the sleeve and having a radially inwardly extending flange engaging the rear end of this cylinder, confine the cylinder within the sleeve. This cylinder has secured in its front end portion sealing means, such as an annular element or gasket of elastic and flexible material, of which a rear end portion is attached to the sleeve in circumferentially continuous sealed relationship and its front end portion projects beyond the end of the sleeve and the housing. The cylinder is longitudinally open for the transmission of the fluid.

The sleeve, in a preferred embodiment, comprises also a plurality of lugs spaced circumferentially along the outer periphery of its longitudinal wall adjacent the front end thereof and projecting forwardly of its front surface. The radially inner surfaces of the lugs are disposed along a circumference at least equal to that of the end of the sleeve wall to receive the end portion of the sleeve of an opposing connector with the lugs of the latter in interdigital relation with the lugs of the first named sleeve.

In the drawing with respect to which this invention is described in detail below:

FIGS. 1, 2, 3, and 4 are transaxial elevations of portions of the connector of this invention in disasembled condition, namely, in the numerical order of these figures; an internally threaded retaining nut, a sleeve and cylinder assembly, a casing, and an externally threaded retainer bushing.

FIG. 5 is a fragmentary elevation of a pair of coupled couplers in dot-dash outline and a pair of connectors supported by the couplers in coupled fluid-transmitting relationship, either connector being representative of the connector of FIGS. 1 to 4 in assembled condition.

FIG. 6 is a fragmentary elevation of the connectors of the connectors of FIG. 5 illustrating one of the connectors partially sectioned.

FIGS. 7 and 8 are rear axial and sectional transaxial views, respectively, of the retainer nut of FIG. 1.

FIGS. 9 and 10 are front axial and transaxial section views, respectively, of the retainer bushing of FIG. 4.

FIG. 11 is a transaxial elevation of a spring normally housed in concentric relation with, and between, the housing of FIG. 3 and the sleeve of FIG. 2.

FIG. 12 is a transaxial elevation of a gasket normally secured in the end of the cylinder of FIG. 15.

FIG. 13 is a transaxial elevation of a bushing normally pressed into the cylinder of FIG. 15 to secure the gasket of FIG. 12 thereto.

FIGS. 14, 15, and 16 are axial rear end, longitudinal elevation in section, and axial front end views of a fluid-conducting cylinder illustrated as a part of the sectioned connector of FIG. 6.

FIGS. 17, 18, and 19 are rear end, longitudinal elevation in section, and front axial views of the sleeve of FIG. 2.

FIG. 20 is a fragmentary section of the front end portion of the sleeve and cylinder in assembled relationship.

FIG. 21 is an elevation in section taken along line 21—21 of FIG. 6.

FIG. 5 illustrates a pair of connectors 4A and 4B disposed underneath and attached rigidly to coupled couplers 5A and 5B, respectively. As shown, each coupler comprises a downward extending flat-sided bracket 7 to which the respective conector 4A or 4B is connected by a bracket 8 of the respective connector housing 9. As shown, the bracket 8 is flatsided with the planes of its sides parallel to the axis M—M along which the connectors are aligned when supported in coaxial relationship. The connectors 4A and 4B are supported with their axis M—M aligned approximately 60° in respect to a vertical longitudinal plane containing the pulling axis of the couplers 5A and 5B. This angle is the same as the angle of deviation from a longitudinal plane of the couplers to which movement of a pair of typical fixed-jaw type couplers is restricted in a final coupling movement. The horizontal angle at which the connectors are oriented relative to the longitudinal axis or vertical plane of its respective supporting coupler will vary with the direction of final coupling movement as found in different types of couplers.

The coupler 4A, selected for purposes of description, comprises the aforementioned housing 9, a a sleeve 10 of greater longitudinal length than that of the housing and adapted to extend therethrough, a spring 11 ordinarily contained within the annular region exteriorly of the sleeve wall 12 and interiorly of the casing wall 13, a cylinder 15 snugly fitting the interior of the sleeve wall 12, a retainer nut 18 adapted for threaded relation with the rear end portion of the sleeve 10, and a retainer bushing 20 normally disposed in threaded telescopic relation with a front end portion of the housing 9. The cylinder 15 in assembled condition further comprises a gasket 22 of rubber, or other flexible plastic material, and a rigid bushing 23 for securing the gasket 22 within a front end portion of the sleeve 15 as hereinafter described.

Considering the housing 9 in further detail, the annular wall 13 consists of several sections concentric with the axis M—M having different diameters to provide an interiorly threaded surface 25 of less diameter than the largest interior cylindrical surface 26 within the housing. Of slightly less diameter than surface 26 is a surface 27 which terminates rearwardly in a radially extending shoulder surface 28. The inner periphery of the surface 28 is formed by the inner cylindrical surface 29 of a rear annular flange portion 31 of the casing. The shoulder surface 28 serves as a seat for the spring 11. The surface 29 is radially outwardly indented to define a groove or keyway 32 for receiving a key-like radial projection 33 of the sleeve 10.

The sleeve 10 (see FIGS. 2, 17 to 20) consists of a longitudinal wall 12 which may have, as shown, an inner cylindrical surface of uniform diameter except for an annular shoulder 35 extending radially inwardly with respect to the cylindrical surface. The outer surface may be uniformly cylindrical, as shown, except for a threaded area 36 forming the extreme rear portion of the outer surface of the sleeve, and an annular flange 37 extending radially outwardly from the wall 12 and located longitudinally thereof approximately one third of the length of the sleeve from its front end. The rear surface 38 of the flange lies, as shown, in a plane perpendicular to the axis M—M and functions as a seat for receiving the front end of the spring 11. The outer wall surface of the sleeve includes a section of slightly enlarged circumference at 39 for closely fitting the front inner periphery of the spring and holding it in approximate concentricity with a secion 40 of smaller circumference extending rearwardly from the section 39. The sleeve section 40 is of less diameter than the rear-opening surface 29 to permit fulcruming of the sleeve within the rear housing opening during angling movements of the sleeve relative to housing. The flange has a front surface 41 which tapers forwardly, adapting it to seat in complementary centered relation with the rear forwardly tapering surface 42 of the bushing 20. Hence, when the sleeve is displaced rearwardly within the housing and then freed for movement forwardly into engagement with the bushing 20, the sleeve is forced into centered relation with the forward and rear opening of the housing. Thus, in an uncoupled connector, the cylinder-sleeve assembly with its forward gasket 22 is always presented to an opposing connector in centered relation with its own housing and, hence, in concentricity with a reliable reference axis for mounting the connector on a coupler.

The projection 33 of the sleeve is shown integral with the wall 12 in forward and adjacent relation with the threaded area 36. The projection 33 is normally disposed within the key-way 32 of the housing and has sufficient length for a portion thereof to be positioned within the key-way at all longitudinal positions of the sleeve relative to the housing necessary for providing a reasonable range of mutual adjustment of coupled connectors. As shown, movement of the sleeve rearwardly relative to the housing is limited by compression of the spring 11 to a "solid" condition. As shown in FIG. 6, the key-way 32 is larger than the projection 33 to accommodate movement of the projection transversely of the key-way during radial movement of the sleeve 10 relative to the housing 9.

The sleeve 10 has a key-way 45 forming a recess in an extreme rear end portion of its interior cylindrical surface radially inwardly of the threaded area 36. The key-way 45 normally receives a key 47 formed integrally with the longitudinal wall 48 of the cylinder 15. With provision of projections 33, 47 and key-ways 32, 45 just described, the sleeve 10 and the cylinder 15 are rendered non-rotatable with respect to the housing and the sleeve, respectively, within the assembled connector.

As shown, the cylinder 15 has an enlarged front flange portion 51 and an outwardly swedged rear cylindrical portion 52 of approximately the same diameter and of nearly the same diameter as the internal cylindrical periphery of the sleeve 10 to enable the cylinder to be positioned within the sleeve in the snugly fitting relationship shown in FIGS. 2, 6, and 20. This arrangement enables passage of the cylinder into and out of the sleeve through the rear end thereof. FIGS. 2 and 20 illustrate that the front end surface 54 of the cylinder engages the rear surface of the shoulder 35 of the sleeve. FIG. 6 shows the retainer nut 18 in threaded telescopic relation with the sleeve 36 and its flange 55 in engagement with the extreme rear end surface 56 of the cylinder. In this manner the cylinder is tightly confined between the shoulder 35 and the retainer nut 18.

The cylinder 15 comprises a tubular elbow or nipple portion 57 extending rearwardly from the end surface 56 to which a service conduit of a vehicle, such as rubber hose, may be attached as shown in FIG. 5. Received in the front end portion of the cylinder is an annular rear end portion of the gasket 22 adapted to fit within an annular recess 61 formed just inwardly of the cylinder end. This recess is flared rearwardly in accordance with the rearward flaring of the gasket. The gasket is secured against escape from the recess by the generally cylindrical ring or bushing 23 engaging the inner periphery of the cylinder with such tightness as to require a press to place it in the position shown wherein it engages the inner periphery of the gasket to cooperate with the recess surface 61 in supporting the gasket during fluid-conducting use.

As shown, the sleeve 10 has three lugs 43 located 120° apart around the front periphery of the sleeve. They have two important functions: (1) to facilitate the movement of the opposed faces of connectors into coaxial alignment during coupling, and (2) to hold the opposed connectors from relative lateral movement to prevent chafing of the gaskets 22. The front outer periphery of the sleeves also defines bosses 44 spaced 120° apart and disposed midway between adjacent lugs. The bosses 44 project radially from the periphery of the end portion of the sleeve 10 and are engaged along their radially outer surfaces by the radially inner surfaces of the lugs 43 of the opposing coupler of two coupled couplers. The lugs have front-facing gathering or guide surfaces 43a which slope rearwardly to join with radially inner surfaces of the lugs. The latter occurs along a circumference just large enough to enable the lugs to fit in close clearance with the outer surfaces of the bosses 44. The surfaces 43a carry out function (1) above.

The connectors are mounted on respective couplers relative to a neutral coupling plane P—P so that, in coupled condition of the couplers, the gaskets of opposed connectors will engage in tightly sealed fluid-conducting relationship approximately along the plane and the sleeve of at least one connector will be displaced rearwardly relative to its housing, as shown in FIG. 6. The gaskets of opposed connectors are compressed inwardly during use to permit approximate metal-to-metal contact of the front surfaces of the sleeves 10.

Normally, assuming the spring 11 of each coupler to be of comparable strength, both sleeves will be displaced rearwardly within their respective housing to produce a clearance between the flange surface 41 and the rear tapering surface 42 of the bushing 20. As the outer perimeter of the flange 37 is substantially less than the inner diameter of the surrounding wall portion of the housing, the fluid-conducting portion of the connector comprising the sleeve 10 is capable, in addition to the longitudinal movements, of angling and toggle movements relative to the housing 9. Hence, the sleeves of two coupled connectors tend to float in both housings as a single unit aligned along a common axis in spite of any type of relative longitudinal, angling, or lateral movement occurring between the housings of the connectors in following corresponding movements of one coupler relative to the other.

In the connector of this invention, as in connectors of the prior art, a common occasion for repair is the replacement of gaskets or other media which form a seal between two connectors. The connector hereinabove described fulfills an important objective of this invention in reducing the time needed for this type of replacement to a matter of a few minutes. This may be done without uncoupling the vehicles on which the connectors are mounted or disturbing the housings of the connectors. A maintenance procedure desirable in the use of the connectors herein described is to have spare cylinders 15, including serviceable gaskets available in storage. Replacement of one gasket is quickly effected by simply unscrewing the nut 18 from the sleeve 10 and withdrawing the cylinder 15 from the sleeve outwardly through the rear end thereof, pulling the worn gasket 22 from the recess by means such as pliers, and inserting a new gasket. The nut 18 is star-shaped with a plurality of radial bosses 59 facilitating manual loosening or tightening thereof. The cylinder with the new gasket is then inserted into the sleeve, the nut 18 screwed back in place to place the connector again in working condition.

Further disassembly of the connector beyond removal of the cylinder 15 from the sleeve may be effected by unscrewing the bushing 20 from the front end of the casing. The bushing passes readily over the radial lugs 44 of the front end of the sleeve since their radial outer surfaces are within a circumference less than the internal circumference of the bushing. The threads 25 of the housing are of greater diameter than the extreme diameter of the flange 37. Hence the sleeve, with the nut 18 removed therefrom, passes readily through the front end of the housing. The spring 11 is also removable through this end of the housing.

The terms and expressions which have been employed are used as terms of description and not of limitation and there is no intention of excluding such equivalents of the invention described, or of the portions thereof, as fall within the purview of the claims.

What is claimed is:

1. A connector for a fluid transmission line adapted for fixed connection with a railway car coupler comprising: an outer housing; an intermediate sleeve longer than the housing and extending therethrough in generally concentric relation therewith; a rigid, hollow cylinder disposed within the sleeve with portions of its exterior surface in concentric snugly-fitting relation with the interior surface of the sleeve; said housing, sleeve, and cylinder having front ends facing, in the normal use of the connector, toward a similar connector coupled therewith, and being disposed generally rearwardly of respective front ends; said housing having a rear opening, and a shoulder portion etxending radially inwardly from a longitudinal wall thereof to define the front opening thereof; annular sealing means located in the front end of said cylinder for engaging the corresponding sealing means of an opposed cylinder; the sleeve having a flange projecting radially outwardly from a longitudinal wall thereof; said flange having a diameter substantially less than the interior diameter of said housing wall and greater than that of the inner periphery of said front shoulder portion, the diameter of said inner periphery being substantially greater than the exterior diameter of said sleeve wall to provide desired ranges of angling and radial movement of the sleeve relative to the housing; resilient means reacting between spaced confronting portions of the housing and the sleeve to urge the sleeve forwardly within the housing to seat said flange against said front shoulder portion when free of an opposed connector; said sleeve having shoulder means adjacent its front end etxending inwardly from its longitudinal wall; a front portion of the cylinder resting against said shoulder means with the rear portion of the cylinder etxending rearwardly beyond the sleeve; said interior sleeve surface and said exterior surface portions of the cylinder being complementarily arranged for movement of the cylinder into the sleeve and into position against said shoulder means, and outwardly therefrom through the rear end of the sleeve; and fastening means cooperating with a rear end portion of the sleeve rearwardly of the housing for engaging and confining the cylinder in a longitudinal direction between the fastening means and said shoulder means; said cylinder being thereby removable from the sleeve without disengaging the front end surface of said sleeve from the corresponding surface of another opposed connector engaged therewith.

2. A connector for a fluid transmission line adapted for fixed connection with a railway car coupler comprising:

an outer housing, an intermediate sleeve, and an inner, rigid, hollow cylinder in generally concentric relation with a common axis in outer to inner order as named; an annular gasket secured in the front end of the cylinder and protruding outwardly therefrom; said housing, sleeve, and cylinder having front ends facing, in the normal use of the connector, toward a similar connector coupled therewith, and disposed generally rearwardly from respective front ends; said housing having axially-spaced shoulder portions extending radially inwardly from its outer wall defining front and rear openings of the housing; said sleeve being longer than the housing and extending through both housing openings, and having a flange extending radially outwardly from a longitudinal wall thereof; said flange having a diameter less than the internal diameter of a longitudinal wall of the housing and a greater diameter than that of the inner periphery of said front shoulder portion, and the diameter of said inner periphery being substantially greater than the outer diameter of said sleeve wall to provide desired ranges of angling and radial movements of the sleeve relative to the housing; resilient means reacting between said flange and said rear shoulder portion to urge the sleeve forwardly relative to the housing to seat the flange against said shoulder portion when free of an opposed connector; said sleeve having a radially inwardly extending arcuate shoulder defining its front opening; said cylinder having a front end surface adapted to seat against said shoulder and a length substantially co-extensive with that of the sleeve; the internal diameter of the sleeve and the external diameter of the cylinder providing snugly fitting relationship and enabling entry and withdrawal of the cylinder from its position against said shoulder through the rear end of the sleeve; and fastening means attached to a rear end portion of the sleeve and engageable with a rearward facing surface of the cylinder for confining the cylinder tightly between said shoulder and the fastening means; said housing comprising two separable sections, each section including one of said shoulder portions for removal of the sleeve from the housing; said cylinder and gasket being thereby removable from the sleeve as a unit without disengaging the front end surface of said sleeve from the corresponding surface of another opposed connector engaged therewith.

3. A connector for a fluid transmission line adapted for fixed connection with a railway car coupler comprising: an outer housing, an intermediate sleeve, and an inner, rigid, hollow cylinder in generally concentric relation with a common axis in outer to inner order as named; an annular gasket secured in the front end of the cylinder and protruding outwardly therefrom; said housing, sleeve, and cylinder having front ends facing, in the normal use of the connector, toward a similar connector coupled therewith and disposed rearwardly of respective front ends; said housing having axially spaced shoulder portions extending radially inwardly from its outer wall defining front and rear openings of the housing; said sleeve extending through both housing openings and having a flange extending radially outwardly from its longitudinal wall inwardly of the housing; said flange having a diameter less than the internal diameter of the longitudinal wall of the housing and greater than that of the inner periphery of said front shoulder portion, and the diameter of said inner periphery being substantially greater than that of said sleeve wall to provide desired ranges of radial and angling movement of the sleeve relative to the housing; a coil spring encircling said sleeve in engagement with said flange and said rear shoulder portion urging said sleeve forwardly within the housing to seat said flange against said front shoulder portion when free of an opposed connector; the sleeev having a shoulder that extends radially inwardly, is concentrically arcuate with respect to said axis, and defines the front opening of the sleeve; the cylinder having a front end portion adapted to seat against the rear side of said shoulder; the cylinder and the sleeve having an external diameter and internal diameter, respectively, generally complementary and enabling insertion of the cylinder through the rear end of the sleeve to obtain seating of said front cylinder surface against said shoulder with said gasket extending frontwardly through said front sleeve opening; and means attached to the sleeve rearwardly of the housing for securing the cylinder within the sleeve against said shoulder; said housing comprising two separable sections, each section including one of said shoulder portions for removal of the sleeve, or the cylinder and the sleeve in assembled condition, from the housing; said cylinder and gasket being thereby removable from the sleeve as a unit without disengaging a front end surface of said sleeve from the corresponding surface of another opposed connector engaged therewith.

4. The connector of claim 3 wherein: the housing section including the front shoulder portion is an externally threaded bushing on threaded telescoping relation with a section comprising the rear shoulder portion.

5. The connector of claim 3 wherein: said fastening means is an internally threaded retainer nut in threaded telescopic relation with a rear end portion of the sleeve; said nut has a radially inward arcuate flange for engaging the rear end of the cylinder.

6. The connector of claim 3 comprising: a plurality of guide lugs attached to the outer periphery of a front end portion of the sleeve; said lugs having radially inward axially-extending surfaces disposed along a circumference equal to the outer circumference of said end portion; said lugs having radially outward axially-extending surfaces disposed along a circumference less than that of said front opening of the housing.

7. The connector of claim 3 comprising: detent means for preventing rotation of the sleeve relative to the housing comprising a key portion and a slot portion, one of said portions being on the sleeve and the other being on the housing to interlock in a radial direction.

8. A connector for a fluid transmission line adapted for fixed attachment with a railway car coupler comprising: an outer housing; an intermediate sleeve longer than the housing and extending therethrough in generally centered relation therewith; a rigid, hollow cylinder disposed within the sleeve with portions of its exterior surface in snugly fitting relation with an interior surface of the sleeve; an annular gasket secured in the front end of the cylinder and protruding outwardly therefrom; said housing, sleeve, and cylinder having front ends facing, in the normal use of the connector, toward a similar connector coupled therewith, and being disposed generally rearwardly of the respective front ends; said housing having a rear opening, and a shoulder portion extending transversely inwardly from a longitudinal wall thereof to define the front opening thereof; a sleeve having a flange projecting transversely outwardly from the longitudinal wall thereof; said flange having a maximum outer dimension substantially less than a corresponding inner dimension of said housing wall and greater than that of the inner periphery of said front shoulder portion, the inner dimension of said inner periphery being substantially greater than corresponding exterior dimension of the sleeve wall to provide desired ranges of angling and transverse movement of the sleeve relative to the housing; resilient biasing means reacting between spaced confronting portions of the housing and the sleeve to urge the sleeve forward within the housing to seat said flange against said front shoulder portion when free of an opposed connector; said sleeve having shoulder means adjacent its front end extending inwardly from its longitudinal wall, the front portion of the cylinder resting against said shoulder means; said interior sleeve surface and said exterior sleeve portions of the cylinder being complementarily arranged for movement of the cylinder into position against said shoulder means, and outwardly therefrom through the rear portion of the sleeve, said cylinder in said position extending rearwardly of the sleeve; and fastening means cooperating with a rear end portion of the sleeve for engaging and confining the cylinder in longitudinal direction between the fastening means and the shoulder means; said cylinder and gasket being thereby removable from the sleeve as a unit without disengaging the front end surface of said sleeve from the corresponding surface of another opposed connector engaged therewith.

References Cited by the Examiner

UNITED STATES PATENTS

| | | | |
|---|---|---|---|
| 782,098 | 2/05 | Anderson | 285—63 |
| 1,123,972 | 1/15 | Woodruff | 285—75 |
| 1,296,230 | 3/19 | Thiem et al. | 213—76 |
| 1,463,261 | 7/23 | Funk | 285—63 |
| 1,635,345 | 7/27 | Robinson | 285—63 |
| 1,863,017 | 6/32 | Larson | 285—63 |
| 2,819,913 | 1/58 | Kayler | 285—25 |
| 2,972,491 | 2/61 | Dutton | 285—316 |

FOREIGN PATENTS

| | | |
|---|---|---|
| 658,618 | 1/29 | France. |
| 576,800 | 5/33 | Germany. |
| 580,654 | 7/33 | Germany. |

CARL W. TOMLIN, *Primary Examiner.*